United States Patent

Naguleswaran

[11] Patent Number: 6,104,290
[45] Date of Patent: Aug. 15, 2000

[54] CONTACTLESS IDENTIFICATION AND COMMUNICATION SYSTEM AND METHOD OF OPERATING THE SAME

[75] Inventor: Thambimuttu Naguleswaran, Singapore, Singapore

[73] Assignee: National University of Singapore, Singapore

[21] Appl. No.: 09/156,180

[22] Filed: Sep. 17, 1998

[30] Foreign Application Priority Data

Sep. 19, 1997 [SG] Singapore ............................ 9703469-8

[51] Int. Cl.[7] .................................................. G08B 13/14
[52] U.S. Cl. ................................. 340/572.1; 340/572.4; 340/825.54; 455/343; 342/42; 342/44
[58] Field of Search .............................. 340/572.1, 572.4, 340/825.54; 455/343; 342/44, 42

[56] References Cited

U.S. PATENT DOCUMENTS

| | | |
|---|---|---|
| 4,068,232 | 1/1978 | Meyers et al. ............................ 342/44 |
| 5,142,699 | 8/1992 | Sato et al. ................................ 455/343 |
| 5,488,376 | 1/1996 | Hurta et al. ................................ 342/42 |
| 5,847,662 | 12/1998 | Yokota et al. ....................... 340/825.54 |
| 5,912,632 | 6/1999 | Dieska et al. ....................... 340/825.54 |

Primary Examiner—Benjamin C. Lee
Attorney, Agent, or Firm—Klarquist Sparkman Campbell Leigh & Whinston, LLP

[57] ABSTRACT

A contactless identification and communication system and method of operating a contactless identification communication system comprising a reader and one or more transponders, wherein the or each transponder is operable to be in RF communication with the reader, which method comprises the steps of: operating the transponder at a first clock rate when the transponder is not transmitting to the reader; and operating the transponder at a second clock rate during transmission of data from the transponder to the reader, the second clock rate being higher than the first clock rate.

8 Claims, 3 Drawing Sheets

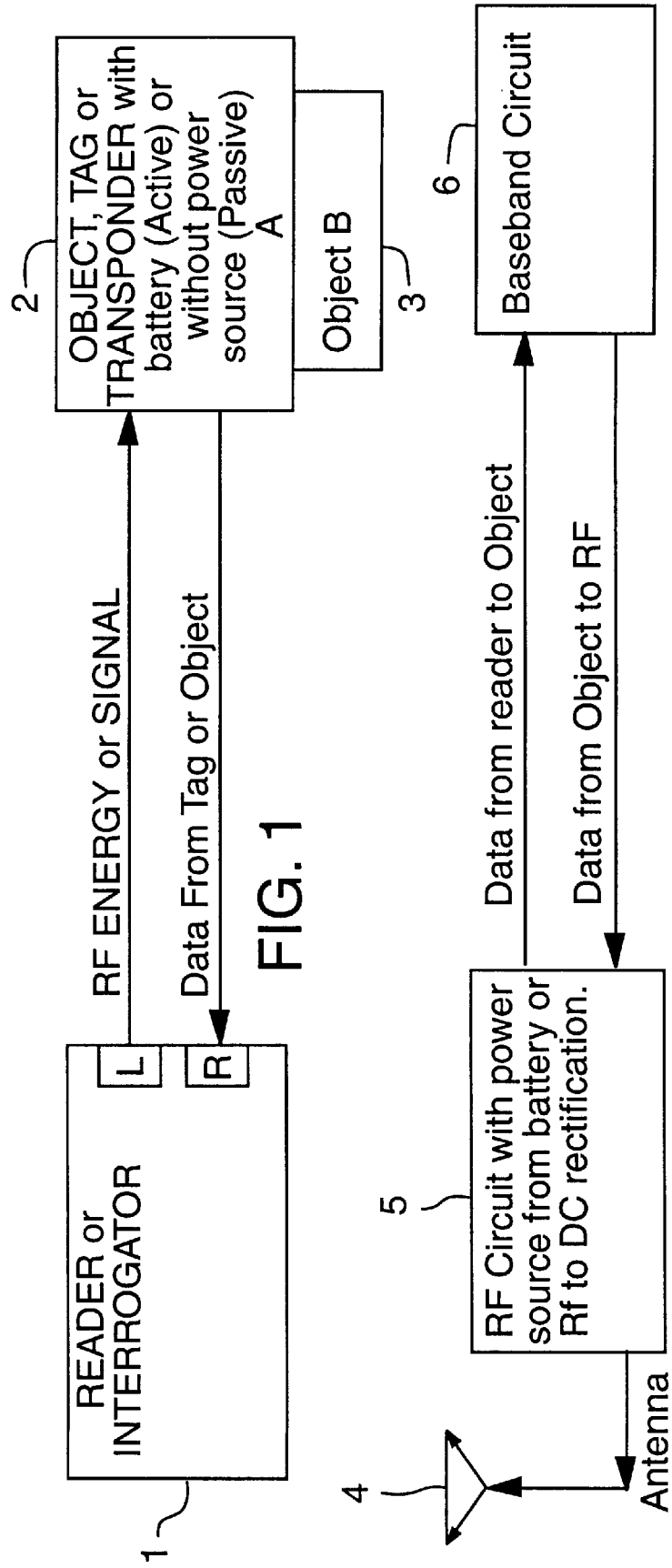

CONTACTLESS IDENTIFICATION AND COMMUNICATION SYSTEM AND METHOD OF OPERATING THE SAME

THIS INVENTION relates to a contactless identification and communication system and method of operating the same and more particularly to a contactless identification and communication system with low power requirements and consumption.

Contactless identification and communication systems can be used in a number of applications such as inventory control, access control, supermarket checkout systems, road tolls, vehicle telemetry, tracking animals and other forms of tagging. In each case, an active or passive transponder attached to or associated with an object to be tagged is able to be interrogated by a reader. Each tag has its own identification code and is able to transmit data including the identification code back to the reader.

The transponder can be active in that it has its own internal power source or can be passive in which case its power is derived inductively from the RF power of the interrogating signal from the reader.

One of the main disadvantages with current contactless identification and communication systems is the slow data rate (in order of Kbits/sec) with which the transponder is able to transmit data to the reader. Such slow data rates mean that if a large number of transponders are to be interrogated, then the time taken to interrogate all transponders in the system is also going to be high. However, if a high data rate is used (in order of hundreds of Kbits/sec), then the transponder would consume more power than lower clock rate systems.

A number of earlier attempts at saving power when operating at high clock rates have been proposed but none have been found to be acceptable for use in contactless identification and communication system applications where the concern is not just the saving of power available from a particular power source such as a battery but rather operating at extremely low voltages and currents (i.e. low power) using available low power sources, in particular those associated with passive transponders which are reliant upon using power which is inductively derived from an FR interrogating signal.

It is an object of the present invention to seek to provide a contactless identification communication system having low power requirements and consumption.

It is a further object of the present invention to provide a method of operating a contactless identification and communication system at high data rates but using low power.

Accordingly, one aspect of the present invention provides a method of operating a contactless identification and communication system a method of operating a contactless identification communication system comprising a reader and one or more transponders, wherein the or each transponder is operable to be in RF communication with the reader, which method comprises the steps of: operating the transponder at a first clock rate when the transponder is not transmitting to the reader; and operating the transponder at a second clock rate during transmission of the data from the transponder to the reader, the second clock rate being higher than the first clock rate.

Another aspect of the present invention provides a contactless identification and communication system comprising one or more transponders operable to be in RF communication with a reader, each transponder having a low speed clock to operate the transponder at a first clock rate and a high speed clock to operate the transponder at a second clock rate and means operable to switch off the low speed clock and switch on the high speed clock during transmission of data from the transponder and means operable to switch off the high speed clock and switch on the low speed clock after data transmission, the second clock rate being higher than the first clock rate.

A further aspect of the present invention provides a transponder for use in a contactless identification and communication system each transponder having a low speed clock to operate the transponder at a first clock rate and a high speed clock to operate the transponder at a second clock rate and means operable to switch off the low speed clock and switch on the high speed clock during transmission of data from the transponder and means operable to switch off the high speed clock and switch on the low speed clock after data transmission, the second clock rate being higher than the first clock rate.

Another aspect of the present invention provides a method of operating a transponder having a serial buffer for storing data, first and second clocks for operating the transponder at respective clock rates, and an RF circuit including a transmitter for transmitting data to a reader, the method comprising the steps of storing data in the serial buffer; including identification code information to identify the transponder, and outputting the data stored in the serial buffer to the transmitter in the RF circuit for transmission to a reader by using the second clock in the transponder.

In order that the present invention may be more readily understood, embodiments thereof will now be described, by way of example, with reference to the accompanying drawings, in which:

FIG. 1 is a schematic representation of a reader and transponder of a contactless identification system embodying the present invention;

FIG. 2 is a schematic representation of a transponder for use with the contactless identification and communication system of FIG. 1;

Figure 3:
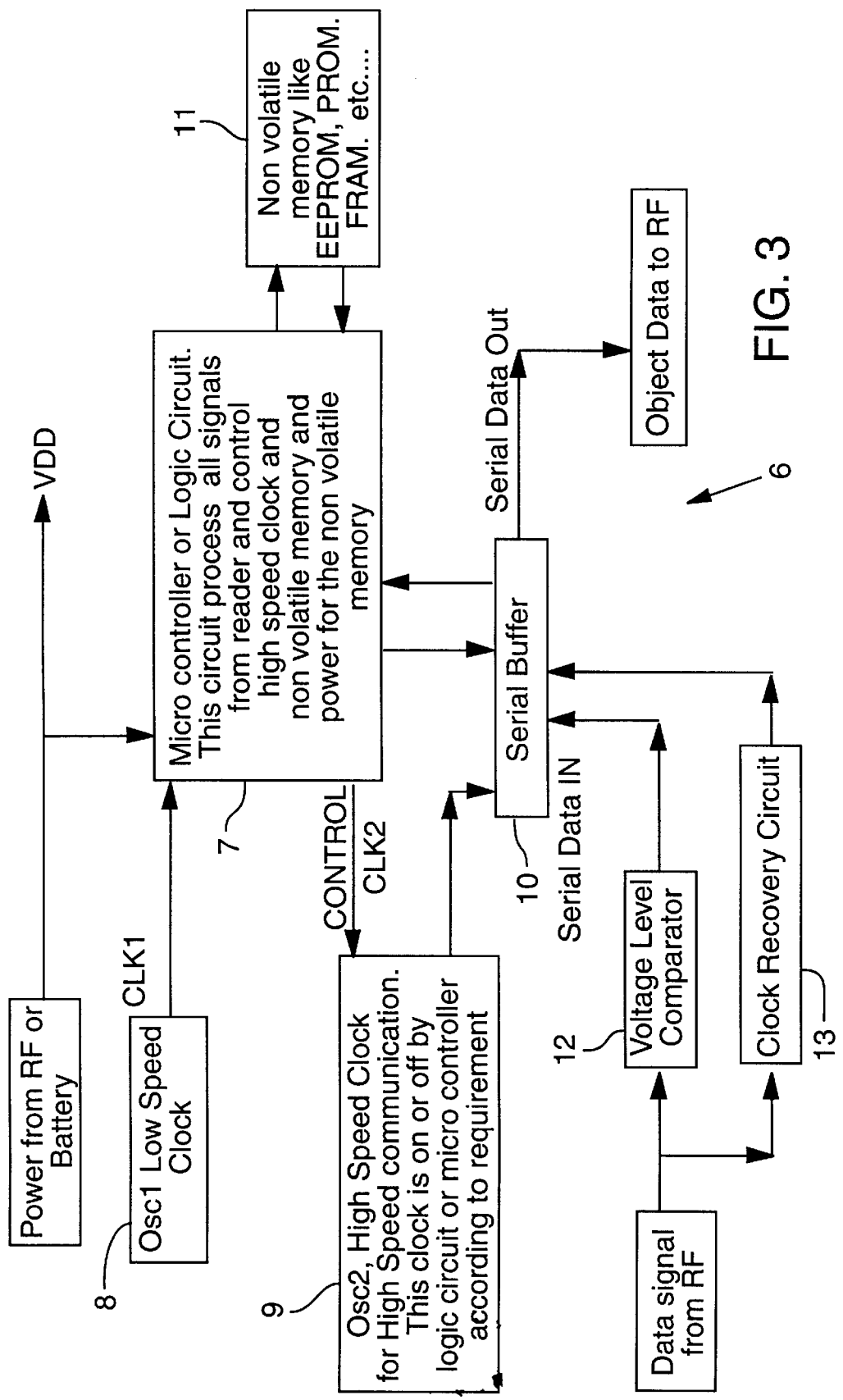
FIG. 3 is a schematic block diagram of the components of the transponder of FIG. 2.

Referring to FIG. 1, a contactless identification communication system embodying the present invention comprises a reader 1 which is in RF communication with one or more transponders 2. Each transponder 2 is attached to or carried by an object 3 to be tagged such as a car, an item of stock, personnel, a vehicle, an animal, etc.

Usually the reader 1 is connected to a mains power supply or a generator. The reader 1 can, therefore, generate high power RF signals, the power of which is only limited by the RF signal power allowed by the relevant telecommunication authorities in the area of operation.

Interrogation signal generated by the reader 1 is received by the transponders 2. In the case of active transponders, the transponder 2 generates and sends a signal back to the reader 1, the signal incorporating an identification code associated with the respective transponder. The active transponder 2 uses its own power supply such as a battery or the like to meet its power requirements. Typically, the signal transmitted by the transponder 2 to the reader 1 is of a lower power than that transmitted from the reader 1 to the transponder 2.

In the case of a passive transponder; the RF energy of the interrogation signal from the reader 1 is converted to a DC voltage within the transponder. Only limited DC power is available from this source (in the order of microWatts) since the RF signal power of the interrogating signal is regulated by telecommunications authorities to minimise health hazards. The maximum DC power achieved is in, for example, a diode rectified RF power source with minimal compared to that available using an active transponder which would consume in the order of milliWatts (about 100 times more than that available to passive transponders).

Referring to FIG. 2, a transponder 2 embodying the present invention comprises an antenna 4 for receiving and transmitting RF signals, an RF circuit for receiving signals transmitted from the reader 1 and for transmitting signals from the transponder 2, which RF circuit also incorporates the power source which is either a battery for an active transponder or an RF energy derived power source such as diode rectified RF power in the case of a passive transponder. The RF circuit receives and sends signals to a base band circuit which is described in greater detail below.

Referring to FIG. 3, the base band circuit 6 is centred around a microcontroller 7 which processes signals received and to be transmitted and the operation of the base band circuit and RF circuit.

The base band circuit 6 has two clocks. A low speed clock 8 which operates in the kilohertz range and a high speed clock 9 which operates in the kilohertz to the megahertz range. Preferably, the low speed clock 8 operates in the 32–50 KHz range and the high speed clock 9 operates in the 100 KHz to 1 MHz range.

The low speed clock 8 drives the microcontroller 7 at the low frequency clock speed. The high speed clock 9 is controlled by a control signal from the microcontroller 7. When the high speed clock 9 is on, the high speed clock drives a serial buffer 10 which outputs serial data stored in the serial buffer to a transmitter in the RF circuit 5 for transmission to the reader 1. The data held in the serial buffer comprises the particular identification code of the transponder 2 as well as other information held in a memory 11. Preferably, the memory is a non-volatile memory such as EEPROM, PROM, FRAM.

The microcontroller 7 is also operable to switch off the high speed clock 9.

In operation, the transponder 2 is normally in a monitoring state in which the low speed clock 8 drives the microcontroller 7 such that the transponder 2 is operating in a low power mode. Upon reception of an interrogation signal from the reader 1 or at a predetermined data transmission time, the microcontroller 7 switches the high speed clock 9 on. The low speed clock 8 is stopped. The high speed clock 9 drives the serial buffer 10 and transmits the contents of the serial buffer 10 through the RF circuit 5 to the reader 1. The data rate of the signal sent by the transponder 2 is dictated by the high speed clock rate and is, therefore, in the order of hundreds of Kbits/Sec. Once the contents of the serial buffer 10 have been transmitted to the reader 1, the serial buffer 10 generates a wake-up interrupt to the microcontroller 7 which triggers a control signal to be sent to the high speed clock 9 to turn off the high speed clock 9 and to wake up the low speed clock 8 so that the transponder 2 returns to its monitoring state operating at a low speed and therefore low power. During the high speed bit transmission of the contents of the serial buffer 10, the transponder 2 is operating at a higher clock speed, at maximum power but for the minimum amount of time.

This arrangement allows a high communication data rate in the order of hundreds of Kbit/Sec whilst only counselling low power in the order of microWatts. The transponder is always able to monitor signals from the reader 1 whilst operating at the low speed clock rate and can initiate communication with the reader 1 whenever required. This allows the system to work at reduced peak power levels which are especially desirable for the operation of passive transponders where only limited RF energy is available for conversion to DC power.

The base band circuit 6 is also provided with a voltage level comparator 12 and a clock recovery circuit 13 so that signals received from the RF circuit can be properly synchronised for transmission to the serial buffer 10 for interpretation by the microcontroller 7.

Figure 4:
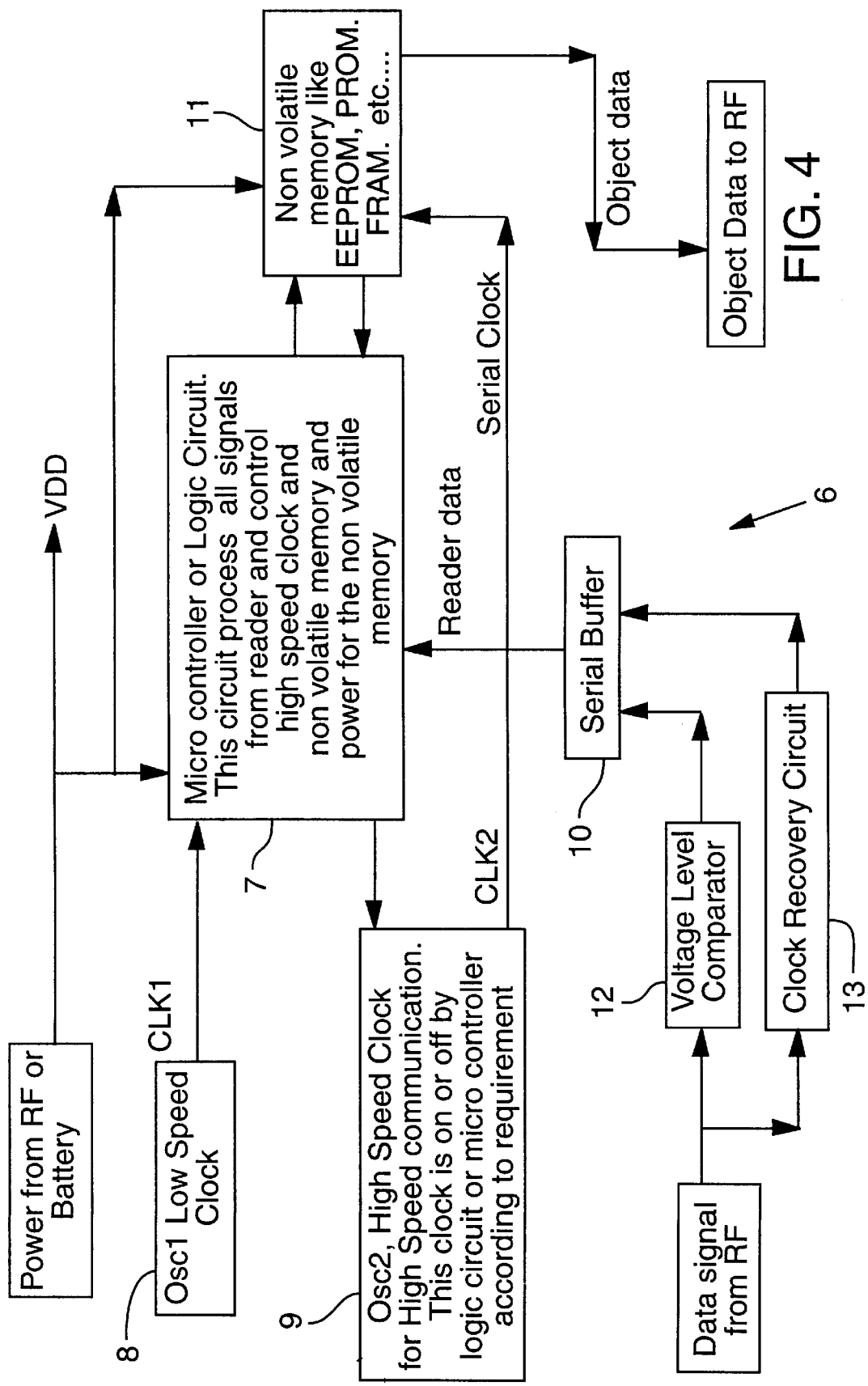
FIG. 4 is a schematic block diagram of another embodiment of the transponder of FIG. 2.

Another embodiment of the base band circuit 6 is shown in FIG. 4. The low speed clock 8 still drives the microcontroller 7 but the high speed clock rather than driving the serial buffer 10 drives the memory 11 such that the memory contents are sent directly to the RF circuit without passing through the serial buffer. The high speed clock is still only activated by the microcontroller 7 either at predetermined times or in response to an interrogation signal from the reader 1. At all other times, the transponder 2 is being driven by the low speed clock 8. Signals received from the reader 1 are interpreted in the same manner as described above with relation to the base band circuit 6 shown in FIG. 3.

What is claimed is:

1. A method of operating a contactless identification communication system comprising a reader and a number of transponders, wherein one of the transponders is operable to be in RF communication with the reader, which method comprises: operating the transponder at a first clock rate when the transponder is not transmitting to the reader; and operating the transponder at a second clock rate during transmission of data from the transponder to the reader, the second clock rate being higher than the first clock rate.

2. A method according to claim 1, wherein the first clock rate is in the order of kilohertz and the second clock rate is in the order of kilohertz to megahertz.

3. A method according to claim 1, wherein the transponder has a passive power supply derived from the RF energy of an interrogation signal from the reader.

4. A method according to claim 1, wherein the transponder includes a microprocessor; the microprocessor switching off a first clock generating the first clock signal and switching on a second clock generating a second clock signal upon reception of an interrogation signal from the reader.

5. A method according to claim 4, wherein a wake-up signal is generated at the end of a data transmission to turn off the second clock and to wake up the first clock.

6. A contactless identification and communication system comprising a number of transponders operable to be in RF communication with a reader, at least one of the transponders having a low speed clock to operate the transponder at a first clock rate and a high speed clock to operate the transponder at a second clock rate and means operable to switch off the low speed clock and switch on the high speed clock during transmission of data from the transponder and means operable to switch off the high speed clock and switch on the low speed clock after data transmission, the second clock rate being higher than the first clock rate.

7. A transponder for use in a contactless identification and communication system, the transponder having a low speed clock to operate the transponder at a first clock rate and a high speed clock to operate the transponder at a second clock rate and means operable to switch off the low speed clock and switch on the high speed clock during transmission of data from the transponder and means operable to switch off the high speed clock and switch on the low speed clock after data transmission, the second clock rate being higher than the first clock rate.

8. A method of operating a transponder having a serial buffer for storing data, first and second clocks for operating the transponder at respective clock rates, and an RF circuit including a transmitter, the method comprising;

storing data in the serial buffer including identification code information to identify the transponder and outputting the data stored in the serial buffer to the transmitter in the RF circuit for transmission to a reader by switching from the first clock rate to the second clock rate in the transponder.

* * * * *

UNITED STATES PATENT AND TRADEMARK OFFICE
CERTIFICATE OF CORRECTION

PATENT NO. : 6,104,290  
DATED : August 15, 2000  
INVENTOR(S) : Thambimuttu Naguleswaran It is certified that error appears in the above-identified patent and that said Letters Patent is hereby corrected as shown below:

References Cited,

To the list of references, please add U.S. Patent No. 5,218,343 Stobbe et al., 6/8/91. This reference was cited on page 3 of an Office Communication mailed 10/26/1999.

Column 3,
Line 62, correct "counseling" to -- consuming --, pursuant to specification page 6, line 15.

Signed and Sealed this

Eighth Day of January, 2002

*Attest:*

JAMES E. ROGAN
*Attesting Officer*    Director of the United States Patent and Trademark Office